Jan. 25, 1938. H. L. BLOOD Re. 20,634

SIZE CONTROLLING MECHANISM FOR BORING MACHINES AND THE LIKE

Original Filed March 10, 1932 2 Sheets-Sheet 1

Inventor

Harold L. Blood

By Geo. H. Kennedy Jr.

Attorney

Jan. 25, 1938. H. L. BLOOD Re. 20,634
SIZE CONTROLLING MECHANISM FOR BORING MACHINES AND THE LIKE
Original Filed March 10, 1932 2 Sheets-Sheet 2
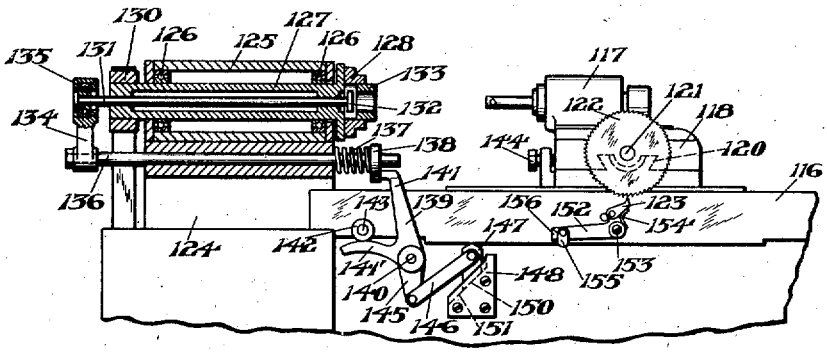
Fig. 6
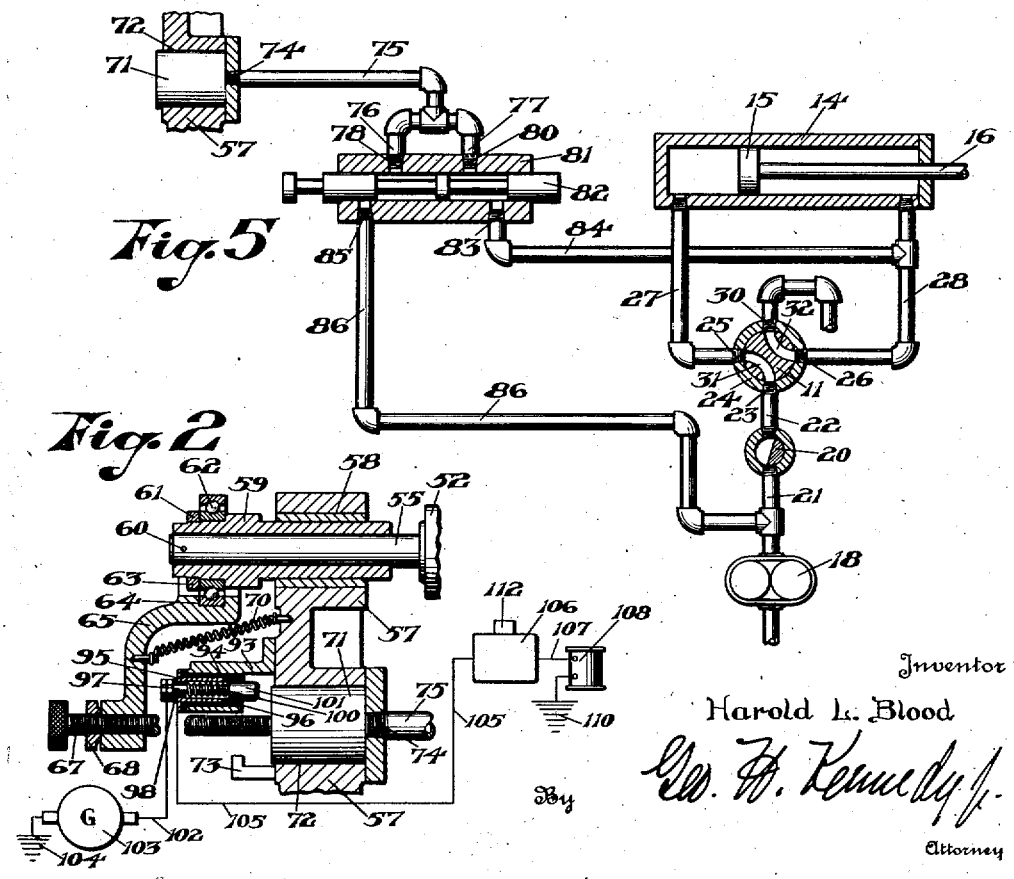
Fig. 5
Fig. 2
Inventor
Harold L. Blood
By Geo. H. Kennedy Jr.
Attorney Reissued Jan. 25, 1938 Re. 20,634

UNITED STATES PATENT OFFICE 20,634

SIZE CONTROLLING MECHANISM FOR BORING MACHINES AND THE LIKE

Harold L. Blood, Worcester, Mass., assignor to The Heald Machine Company, Worcester, Mass., a corporation of Massachusetts Original No. 2,041,898, dated May 26, 1936, Serial No. 598,035, March 10, 1932. Application for reissue June 14, 1937, Serial No. 148,203

29 Claims. (Cl. 77—3)

The present invention relates to machines which are used to impart a predetermined finished dimension to corresponding surfaces of a succession of similar workpieces; the invention is particularly applicable to boring and like machines wherein it is customary for the cutting tool to operate on a considerable number of the successively-presented workpieces before there is need to make any adjustment of the tool, to compensate for wear of its cutting surface.

That is to say, in machines of this character, the initially established position of the cutting tool relative to the axis of the work holder, for the production of a workpiece bore of predetermined finished size, can usually be maintained for the finishing and sizing of a considerable number of successive workpieces,—this being due to the fact that the tool is made of extremely hard material such as diamond or tungsten carbide, and is thus able to impart the desired finished size to quite a number of workpieces, before undergoing perceptible wear or loss of cutting efficiency. But eventually, from repeated finishing and sizing operations performed on increasing numbers of workpieces, the tool becomes slightly worn, and therefore incapable, in its originally established setting, of imparting the desired finished dimension to the work, since such dimension is dependent upon the distance of the tool's cutting surface from the workpiece axis. Any workpiece finished by such a slightly worn tool in its original setting will usually be offsize, i. e., with its finished surface dimension differing slightly from that established by the original setting of the tool.

Heretofore, in the operation of machines of this character, to obtain substantial uniformity of dimension for all the workpieces finished in a protracted run of the machine, it has been necessary to check the dimension of each finished workpiece by manual gaging; whenever such manual gaging has revealed an offsize workpiece, the run of the machine on such workpieces has had to be interrupted, to permit the tool position to be checked, and to permit such manual adjustment of the tool, relative to the workholding member, as will reestablish the tool's cutting surface in the proper position to finish the next-presented batch of workpieces to within the size limits of the gage device. Necessarily, the time and attention required for this manual gaging of each finished workpiece, as well as for these periodic shut-downs of the machine, have a serious effect on the productive capacity of the machine.

Objects of my invention are to provide in a machine of this class for the mechanical calipering or gaging of each finished workpiece in the machine itself, and to provide an automatic compensatory adjustment of the cutting tool's position relative to the workholding axis in response to the reaction of said gaging device to an offsize finished workpiece.

I am aware that the mechanical gaging of successive workpieces in machines for finishing to a predetermined dimension has heretofore been proposed; for example, the Kempton and Gallimore Patent No. 1,731,719 of October 15, 1929, discloses an internal grinding machine equipped with a work-calipering or gaging device which operates as a determinant of the finished dimension of the bore of each workpiece, in that said device, under influences urging it all through the grinding operation toward the gradually-enlarging bore, will finally, when the bore gets large enough, move into same and cause termination of the grinding operation. But in such patented machine, involving repeated back and forth traverses of the workpiece by the grinding tool, as well as a progressive lateral or crossfeed tool movement, to cut deeper and deeper into the workpiece surface until the predetermined size is reached, the mechanical gaging device, as a size determinant, influences the machine operation in identically the same way for every workpiece. In consequence, said Kempton and Gallimore gage control is wholly inapplicable to the objects herein dealt with, which contemplate a mechanical gaging device that comes into action on any workpiece only after the latter has been finished, and that influences the machine operation only as to its cutting on subsequent workpieces and only in those relatively rare instances when an offsize workpiece, by reason of the accumulative wear of the tool, has been produced; at all other times, the gaging device must be without influence on the operation of the machine.

Other and further objects and advantages will appear from the following detailed description taken in connection with the accompanying drawings, in which:—

Fig. 2 is an enlarged vertical section of the end of the workhead of Fig. 1 with the electrical connections thereto shown diagrammatically.

Fig. 5 is a fluid pressure diagram.

Fig. 6 is a fragmentary view similar to Fig. 1 showing a modification of the invention.

Like reference characters refer to like parts in the different figures.

Figures 1, 3, 4:
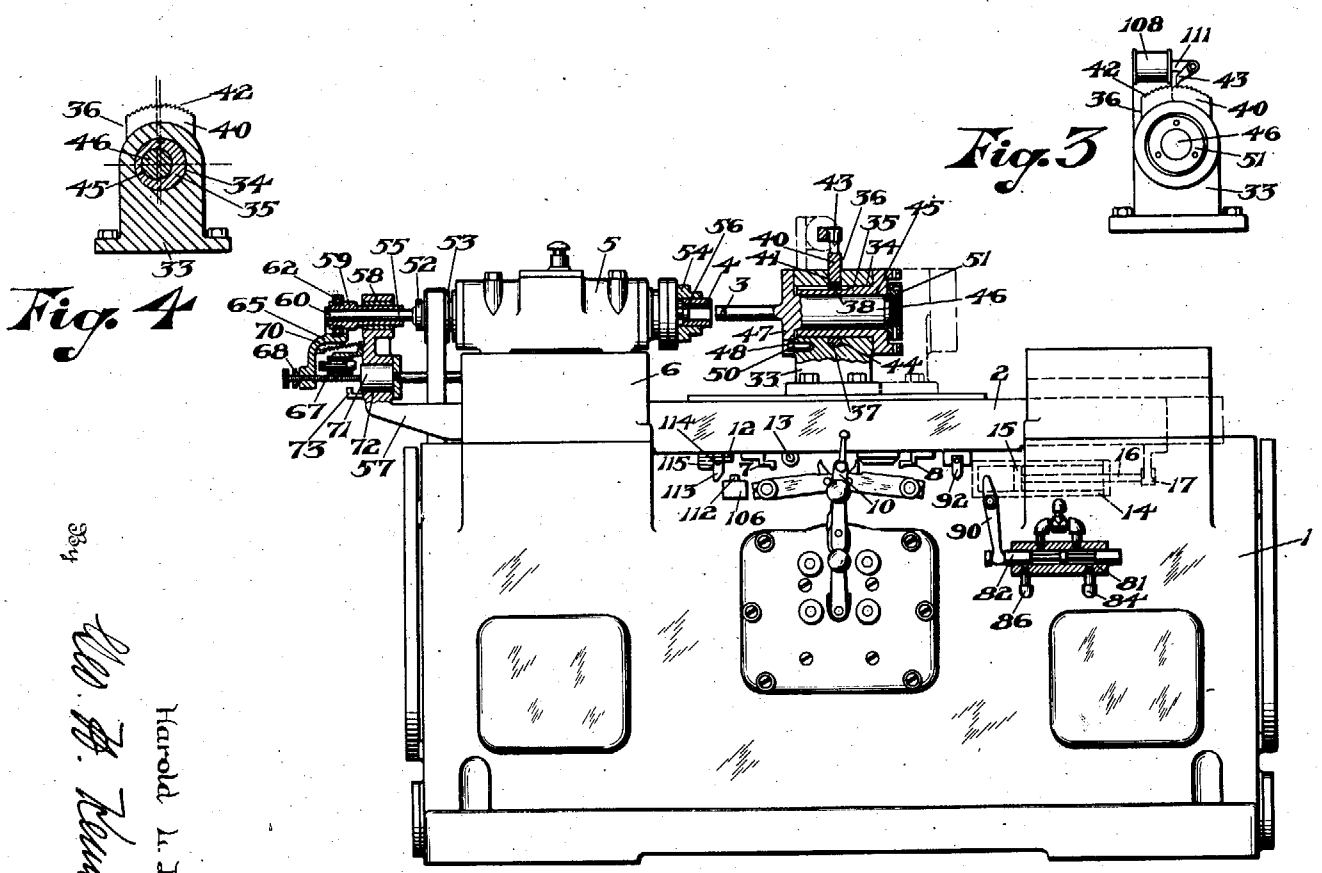
Fig. 1 is a front elevation of a machine embodying the invention, certain of the parts thereof being broken away to show the construction.
Fig. 3 is an end elevation of the cutting tool spindle and the mechanism associated therewith as seen from the right of the machine.
Fig. 4 is a cross section of the wheel head, showing the compensatory mechanism for the cutting tool spindle.

Referring to Fig. 1, the invention is shown in connection with a precision boring machine of well-known type. In such a machine, the base 1 supports a horizontally movable table 2 slidable on ways not shown, said table being actuated by fluid under pressure to produce relative movement between a cutting tool 3 and a workpiece 4, for the longitudinal traverse of the latter by the former. To obtain this relative movement, either the tool or the work may be carried by the table 2; as here shown, by way of example, the movable table carries the tool 3, while the workpiece is held in a workhead 5 which is mounted on a bridge 6 that spans the slideways provided by the machine base. The cutting operation of the tool on the workpiece can be effected in the usual manner during the travel of the tool along the work either by rotating the tool 3, or by rotating the workpiece 4, as desired; as here shown, by way of example, the necessary relative rotation between the parts is obtained by imparting rotation to the workpiece.

The cutting operation on each workpiece involves a single passage of the tool along one surface of the rotating workpiece, said workpiece being usually finished to within the desired size limits by this single cut as the table 2 is moved to the left to advance the tool along the surface of the workpiece. The table then moves to the right to withdraw the tool from the workpiece, in the manner disclosed in the above noted Schmidt application. It is sufficient to note for the purposes of the present application that a pair of dogs 7 and 8 are carried by the table 2 for engagement with a reversing lever 10 which is connected to and rocks a reversing valve 11, see Fig. 5. At the end of the movement of the table to the left, after the cutting tool has passed through the workpiece, the reversing lever 10 is engaged by the right hand reversing dog 8 and is rocked counterclockwise, thereby rocking the reversing valve 11 and procuring movement of the table to the right to withdraw the cutting tool from the workpiece. As the carriage moves to the right, it is brought to rest by engagement of a stop dog 12, on the table, with a stud 13 rigidly mounted on the base of the machine; said engagement occurs just as the reversing lever 10 is engaged by and brought into upright position by the dog 7, at which time the reversing valve 11 is in mid-position and the flow of fluid through said valve is entirely cut off.

Referring now to Figs. 1 and 5, the fluid pressure mechanism by which the table is actuated comprises a cylinder 14 which is carried within the base 1 of the machine and which receives a piston 15 slidable therein; a piston rod 16 projects beyond the cylinder 14 and the end of the rod is secured to a lug 17 on the table 2. Fluid under pressure from the pump 18 is directed through a throttle valve 20, Fig. 5, to the reversing valve 11 by pipes 21 and 22; the pipe 21 connects the pump 18 to the throttle valve 20 and the pipe 22 connects the throttle valve 20 to the inlet port 23 of the reversing valve casing 24. Ports 25 and 26 in the casing 24 are connected to the opposite ends of the cylinder 14 by pipes 27 and 28, and the casing 24 is also provided with an outlet port 30. In response to movements of the valve 11 by the reversing lever 10 in the manner above disclosed, channels 31 and 32 in the reversing valve 11 direct fluid under pressure alternately to opposite ends of the cylinder 14 to procure the above-mentioned longitudinal movements of the table.

The above mechanism is not of itself the subject matter of the present invention; the latter involves the attainment, in connection with such or similar mechanism, of the novel results heretofore set forth. In accordance with the present invention, a gage member is urged toward the workpiece in the machine as the cutting tool is being withdrawn from such finished workpiece. If the bore of the finished workpiece permits the gage to enter therein, thereby establishing that this particular workpiece is finished to within the predetermined size limits,—then the machine remains absolutely uninfluenced by said gage, and in this unchanged condition operates on the next workpiece. On the other hand, if the bore of any finished workpiece does not permit said gage to enter, then the response to such non-entry is a slight crosswise relative shifting movement between workpiece and tool, to so change the distance of the tool's cutting edge from the workpiece axis that the next cutting operation of the tool will produce the desired dimension.

Referring first to Figs. 1, 3 and 4, which show the mounting for the cutting tool, the table 2 carries a bracket 33 securely mounted to the top thereof, said bracket having a longitudinal bore 34 therein which receives an eccentric sleeve 35. A member 36 has an annular portion 37 which surrounds the sleeve 35 and is secured to said sleeve by a key 38. A projecting portion 40 of the member 36 extends through a slot 41 in the bracket 33 and carries beyond the surface of said bracket a plurality of ratchet teeth 42 which are arranged to be engaged by a pawl 43, the latter when moved, as hereinafter described, procuring a transverse compensatory movement of the cutting tool.

The annular portion 37 of the member 36 is rotatably received in an annular recess 44 in the bracket 33 and can therefore rotate the sleeve 35 to which said member 36 is keyed. The sleeve 35 has an eccentric bore 45 extending longitudinally thereof in which is mounted the right hand end of a spindle 46, the cutting tool 3 being carried by the left hand end of said spindle. An annular flange 47 on said spindle 46 substantially midway of the length thereof engages the left hand end of the bracket 33 and is provided with a notch 48 which receives the projecting end of a pin 50 mounted in the bracket 33. The pin 50 holds said spindle 46 against rotation relative to the bracket to maintain the cutting tool in proper angular position, but permits rotation of the sleeve 35 about said spindle, the latter being held against axial movement in said sleeve by a nut 51 which is screw threaded on the right hand end of said spindle and engages the end of the sleeve 35. Thus rotation of the sleeve 35 in the bracket 33, occurring only when the pawl 43 is moved, causes a very slight lateral feeding movement of the cutting tool transversely of the table without an appreciable change in the elevation of said tool or in the angular position of said tool, this lateral feeding movement, to compensate for wear on the cutting surface of said tool, being effected, as will now be described, only when the machine produces a workpiece which is not within the predetermined limits of size.

Referring now to Figs. 1 and 2, the workhead 5 which is mounted on the bridge 6 supports a rotatably mounted hollow spindle 52, the left hand end of which carries a pulley 53 by which the spindle is rotated. A workholding member 54 which is mounted on the right hand end of the spindle is arranged to clamp the workpiece 4 in axial alinement with said spindle. A gage rod 55 extends slidably through the hollow spindle and carries on the right hand end thereof a gage member 56 which just fits the desired diameter of workpiece bore and is arranged to be brought into operative relation to the workpiece 4, as each successive workpiece is finished.

A bracket 57 which is carried by the bridge 6, as shown in Fig. 1, has a bore 58 therein in alinement with the gage rod. A sleeve 59 rotatable in said bore and also axially slidable therein receives the left hand end of the gage rod and is secured thereto by a pin 60. The inner race 61 of a ball bearing 62 is clamped on the left hand end of said sleeve 59 by a clamping nut 63 and the outer race of said ball bearing is received in a groove 64 in an arm 65, thereby compelling said arm to move axially with the gage rod and sleeve, but allowing rotation of the sleeve and gage rod in said arm. The depending lower end of arm 65 has threaded therein a horizontal rod 67, said rod being longitudinally adjustable in said arm and being locked in adjusted position by a clamping nut 68. A spring 70, the ends of which are secured respectively to the arm 65 and to the bracket 57 urges the arm 65 and the gage rod toward the right, to make the gage member 56 operative, with respect to the bore of the finished workpiece 4.

During the cutting operation, as the cutting tool is moving to the left and into the workpiece bore, the gage member 56 is withdrawn from contact with said workpiece to avoid contact between said gage and the cutting tool. To accomplish this, the right hand end of the rod 67 is in alinement with, and is engaged by a piston 71, slidable in a cylindrical bore 72 provided by the bracket 57. Said piston 71, during the left hand movement of the table, is urged to the left by fluid under pressure, thereby withdrawing the gage from the workpiece. Movement of the piston 71 toward the left is limited by a stop 73 secured to the bracket 57, said stop engaging the outer end of said piston at the left hand end of the piston movement.

Referring to Fig. 5, a port 74 in the cylindrical bore 72 is connected by a pipe 75 and branch pipes 76 and 77 to spaced ports 78 and 80 in a valve casing 81 which is mounted on the front of the base 1 of the machine, as shown in Fig. 1. A cylindrical valve 82 in the casing 81 provides fluid connection, in one position, between the port 80 and an inlet port 83 in the casing 81 which port is connected by a pipe 84 to the pipe 28, the latter providing connection between the reversing valve 11 and the right hand end of the cylinder 14. In the other position of the valve 82, fluid connection is provided between the port 78 and a second inlet port 85 which is spaced from the port 83 and which is connected by a pipe 86 to the pressure side of the pump 18. As shown in Fig. 1, the valve 82 is actuated in response to movements of the table 2 through a pivoted lever 90, the upper end of said lever being in alinement with a depending dog 92 carried by the table.

Through the above-described means, the movements of the valve 82 in response to the table movements, control the position of the gage member relative to the workpiece. Referring to Fig. 5, which represents the elements in a position corresponding to the position of the parts in Fig. 1, with the table at this time moving to the right and with the cutting tool withdrawing from the bore of the just-finished workpiece, fluid under pressure is entering the left hand end of the cylinder 14, being directed thereto by the reversing valve 11. At the same time, fluid from the cylindrical bore 72 is exhausting through ports 80 and 83 into the pipe 28 and thence through the exhaust port 30, thereby permitting the gage 56 to be urged to the right under the influence of the spring 70 toward the finished workpiece bore; and assume, as to this particular workpiece, that the bore permits entry of said gage. As the carriage continues its movement to the right, the dog 92 engages and rocks the lever 90, moving the valve 82 to the left to admit fluid from the pump 18 through the pipe 86 and port 78 to the cylindrical bore 72. The piston 71 is thus urged to the left and withdraws the gage from the bore of the workpiece before the table reaches the rest position shown in dotted lines in Fig. 1, this permitting removal of the completed workpiece and the insertion of an unfinished workpiece within the workholding member.

At the start of the cutting operation on this subsequent workpiece, as the table begins to move from the rest position shown toward the left in response to fluid under pressure which is admitted to the right hand end of the cylinder 14, the gage is maintained out of work-engaging position by fluid under pressure which passes through the pipe 86 to the cylindrical bore 72, the valve 82 being still in the left hand position. During this movement of the tool to the left toward the workpiece, the dog 92 engages the lever 90 and the valve 82 is returned to the position shown. Since fluid under pressure at this time is entering the right hand end of the cylinder through the pipe 28, fluid under pressure passes from the pipe 28 through the pipe 84 to the cylindrical bore 72 and the gage is thus maintained out of contact with the workpiece regardless of the position of the valve 82. However, when the table is reversed at the left hand end of its stroke, fluid under pressure exhausts from the right hand end of the cylinder 14 and accordingly is allowed to exhaust from the cylindrical bore 72 and the gage member 56 is then moved by the spring 70 toward the bore of the workpiece.

As above pointed out, so long as each successively finished workpiece is sufficiently large to permit entry of the gage therein, no compensatory movement of the cutting tool occurs. However, when a workpiece in the workholding member, after the cutting operation has been performed thereon, is too small in diameter to permit the gage to enter therein, the pawl 43 is moved, and imparts a compensatory lateral shifting movement to the tool 3. Referring to Fig. 2, a support 93 is mounted on the bracket 57 and provides a cylindrical bore 94 in which is mounted a sleeve 95, the latter being separated from the cylindrical bore 94 by insulating material 96, and extending only a portion of the length of the cylindrical bore. A plunger 97 is slidable within the sleeve 95 and is spaced therefrom by an annulus 98 of insulating material which is secured in the left hand end of the sleeve 95. The plunger 97 is urged to the right by a spring 100, the left hand end of which engages the annulus 98 and the right hand end of which engages the enlarged right hand end 101 of the plunger 97, said end 101 normally contacting the insulation 96 beyond the sleeve 95 when the piston 71 is in its right hand position, Fig. 2.

The sleeve 95 and plunger 97 are included in an electrical circuit for the occasional energization of an electromagnet, adapted to actuate the pawl 43. That is to say, the plunger 97, as shown in Fig. 2, is connected by a lead 102 to a generator 103 shown as grounded at 104, and the sleeve 95 is connected by a lead 105 to one terminal of a normally-open switch, not shown, contained in a switch box 106 on the front of the machine; the other terminal of said switch is connected by a lead 107 to one terminal of an electromagnet 108, the latter's other terminal being grounded as shown at 110. Said electromagnet 108 which, as shown in Fig. 3, is mounted on the bracket 33, has a movable armature 111, the outer end of which pivotally supports the pawl 43 in operative relation to the ratchet teeth 42 on member 36. When the electromagnet 108 is energized, the armature 111 is drawn to the left, causing the pawl 43, by its engagement with teeth 42, to move the member 36 and thereby, in the manner above described, to procure the desired slight lateral compensatory movement of tool 3.

Said electrical circuit, containing electromagnet 108, is subject to opening and closing at two places, namely, between the sleeve 95 and plunger 97, and between the contacts or terminals of the switch contained in box 106,—and thus no current flows through the electromagnet unless, in the operation of the machine, said circuit is closed at both of these places at the same time. Periodically, in the operation of the machine, the plunger 97 is moved into electrical contact with sleeve 95; as shown in Fig. 2, the end 101 of plunger 97 is in the path of piston 71, and therefore on the left hand table movement, when the piston 71, as heretofore described, also moves to the left, in order to carry the gage 56 away from the workpiece, said piston 71, by its engagement with end 101, will push the plunger 97 far enough to the left to effect contact of end 101 with sleeve 95. But during this left hand table movement, there is no closure of the switch in box 106; said switch is arranged to be closed by the depression of a push button 112, the latter being in the path of a dog 113 which is pivotally mounted on a pin 114 carried by the table 2; this dog 113 is free to rock counterclockwise on said pivot 114, and therefore in the left hand travel of said table, despite the passage of dog 113 over button 112, there is never any closure of the switch in box 106,—the dog 113 yielding upwardly as it moves over the button 112, thus leaving the switch open and the electromagnet 108 deenergized, despite the fact that, as above described, the piston 71 has established contact of plunger 97 with sleeve 95.

At the commencement of the ensuing right hand or reverse travel of table 2, the piston 71, with the valve 82 in the position shown by Fig. 5, is free to be moved to the right by spring 70, and if the just-finished workpiece permits entry therein of gage 56, then the full right-hand movement of said piston 71 takes place, in consequence of which said piston moves away from the end 101 of the plunger 97 and allows the spring 100 to effect separation of said end from the sleeve 95. Further on in the right hand travel of the table, the dog 113 engages with button 112, and on this movement, because of a shoulder 115 on the table which prevents clockwise rocking of dog 113 on its pivot 114, the button 112 is depressed, to momentarily close the switch. But under the conditions assumed (the entry of gage 56 into the workpiece), this closure of the switch in box 106 is without effect on the electromagnet 108, because prior to such switch closure, the above-described separation of plunger 97 from sleeve 95, by reason of the full right hand movement permitted to the piston 71, has already occurred.

But if on such right hand table movement, the gage 56 cannot enter the bore of the just-finished workpiece, then the piston 71 cannot complete its right hand movement in cylinder 72; said piston remains instead in contact with the end 101 of plunger 97 and thus the contact of said plunger with sleeve 95 is maintained. As a result, when the right hand table travel, as above described, effects a momentary closure of the switch in box 106, the electromagnet 108 is energized to move the pawl 43 so that, before the next cutting operation of the machine, the tool 3, by turning of the eccentric sleeve 35, will be given a slight lateral adjustment. Thus the next cutting operation of the machine, whether it be on the offsize workpiece that has produced such adjustment, or on a fresh workpiece, will be performed under conditions different from those theretofore prevailing, i. e., conditions calculated to insure the cutting by said tool of a slightly larger workpiece bore than the one that excluded said gage.

In the use of the machine, starting with the table in its extreme right hand rest position, the operator rocks the lever 10 to initiate the left hand table travel that carries the tool 3 into and through the workpiece for the performance of the cutting operation thereon,—during which movement, as above described, the gage 56 is retracted from the workpiece so as to be out of the way of the tool. When the tool on this left hand table movement has passed entirely through the workpiece, thus completing the cutting operation thereon, the table dog 8 strikes the lever 10, rocking the valve 11 into the position shown by Fig. 5 and thereby reversing the table travel, so as to withdraw the tool from the finished workpiece bore and to return the table to its extreme right hand rest position. In the first part of this right hand table movement, before the dog 92 strikes the lever 90, the gage 56 moves to the right toward the workpiece, and if the latter permits entry therein of said gage (and the shifting of piston 71 to the right), the separation of plunger 97 from sleeve 95 occurs, in normal fashion, ahead of the closure of the switch in box 106; thus, under these conditions, for the cutting operation on the next-presented workpiece, the tool remains in exactly the same position or setting that produced in the preceding workpiece a bore large enough to receive the gage, and this holds true for subsequent operations so long as each finished workpiece receives the gage. Only when a finished workpiece bore will not permit entry of the gage is there any departure from the cycle of operations above described; when such non-entry occurs (preventing the piston 71 from moving to the right), the contact of plunger 97 with sleeve 95 is prolonged beyond normal, so that closure of the switch in box 106 energizes the electromagnet 108, thereby repositioning the tool to compensate for the wear thereon that has caused the production of an offsize workpiece. Following this compensatory movement, the cutting operations on successive workpieces take place without compensatory movement provided the gage enters the bore of each workpiece during the withdrawal of the cutting tool from said workpiece. When the cutting tool again becomes worn and any workpiece is finished to a size which fails to permit the gage to enter therein, another compensatory movement takes place in the manner above described.

Referring now to the modification of Fig. 6, the invention is disclosed in a mechanism which is operated mechanically and in which the movements of the gage member are controlled directly from the movements of the table. In this modification, the table 116 carries a tool head 117 on a cross slide 118 which is movable on ways 120 on said table, and transverse movement of the tool head is procured in response to rotation of a cross-feed screw 121, the forward end of which carries a ratchet wheel 122 which is engaged by a pawl 123, said pawl being actuated only if and when the size of a finished workpiece is such that the gage is prevented from entering the finished bore therein.

A bridge 124 which spans the slideways, not shown, for the table 116 at the left hand end thereof, supports a workhead 125 thereon, and said workhead provides spaced bearings 126 for the reception of a hollow work spindle 127, the latter carrying on the right hand end thereof a workholding member 128 and on the left hand end thereof a pulley 130 by which said spindle is rotated. A gage rod 131 is slidable longitudinally through said spindle and the right hand end thereof carries a gage member 132 for entry within the bore of a workpiece 133 mounted in the workholding member 128. An arm 134 is secured against axial movement on the left hand end of the gage rod 131 by means of the ball bearing member 135 and the depending end of the arm 134 is secured to a rod 136 supported by and slidable longitudinally through the bridge 124 in parallel relation to the gage rod 131. The opposite ends of a spring 137 which surrounds the rod 136 engage respectively the bridge 124 and a collar 138 adjacent the right hand end of rod 136, said spring normally urging the rod 136 and accordingly the gage rod 131 toward the right to carry the gage member 132 into engagement with the workpiece.

A bell crank lever 139 pivotally mounted on a stud 140 on the front of the machine has the end of one arm 141 in engagement with the collar 138, and the other arm 141' thereof, which is arcuate, stands in the path of a roller 142 mounted on a stud 143 on the table, said roller engaging said arm as the table is brought to rest position at the right hand end of its movement to depress said arm, thereby withdrawing the gage rod to the left carrying the gage out of engagement with the bore of the workpiece and permitting removal of the finished workpiece from the work-holding member and the insertion of an unfinished workpiece therein.

As the table moves toward the left, as by the fluid control means above disclosed, a bolt 144 carried in a bracket on the table engages the right hand end of the rod 136 to carry said rod to the left and accordingly to withdraw the gage member away from the workpiece to permit passage of the cutting tool therethrough. As the table is reversed and returns to the right, the bolt 144 is carried out of engagement with the rod 136 and the spring 137 carries the gage to the right into the bore of the workpiece. As the table moves further to the right to rest position, the roller 142 engages the arm 141' of the bell crank lever 139 and withdraws the gage from the workpiece as above stated.

The bell crank lever 139 has an arm 145 depending therefrom, said arm being connected by a link 146 to a lug 147 which is slidable on a block 148 carried on the base of the machine, said lug and block having cooperating inclined surfaces 150 and 151 so that movement of said lug in response to rocking movement of the bell crank lever results in a raising or lowering of said lug relative to the table. The table 116 carries a bell crank lever 152 which is pivotally mounted on a stud 153 on said table. One end of the bell crank lever 152 carries the pawl 123 which is held in engagement with the ratchet wheel 122 by a spring 154; the other end of the bell crank lever carries a pivotally mounted dog 155 which is held against clockwise rotation from the normal depending position shown by a projection 156 on the bell crank lever. The dog 155 in the movements of the table is adapted to strike the upper end of the lug 147, when the latter is in raised position.

As the table moves to the left, the dog 155 swings on its pivot and passes over the dog 147 without movement of the lever 152. As the table returns to the right, however, the gage member 132, by retraction of bolt 144, is allowed to move, under the influence of spring 137, to the right; if said gage can enter the finished workpiece, this will allow the collar 138 to rock the lever 139 far enough to carry the lug 147 down out of the path of the dog 155 so that no movement of the bell crank lever 152 occurs during the right hand movement of the table. Upon failure of the gage member to enter a workpiece during the right hand movement of the table, by reason of the small diameter of said workpiece, the bell crank lever is not rocked clockwise enough to withdraw the lug 147 out of operative position, so that said lug 147 is retained in its raised or right hand position in the path of the dog 155. The latter's engagement with the lug rocks the lever 152, and moves the pawl 123, thereby actuating the ratchet wheel 122 to procure a transverse feeding movement of the cutting tool.

The operation of the modification which will be apparent from the preceding discussion will be briefly summarized. An unfinished workpiece having been placed within the workholding member, the table is started from the rest position shown, and moves to the left to carry the cutting tool into engagement with the rotating workpiece. At the beginning of this left hand movement, the gage which has been held out of engagement with the workpiece by the roller 142 is released and allowed to abut the inner end of the workpiece. Further table movement to the left carried the bolt 144 into engagement with the right hand end of the rod 136, thereby carrying the gage away from the workpiece as the cutting tool enters therein. During this left hand movement, the dog 155 has yielded, in passing over the lug 147, without the lever 152 being actuated thereby. After the cutting tool has passed through the bore of the workpiece during the left hand movement, the table is reversed, as by the mechanism shown in Fig. 1, and the table moves to the right carrying the bolt 144 out of engagement with the end of the rod 136 and permitting the gage to move toward the finished bore of the workpiece. Entry of the gage allows rocking of lever 139 which carries the lug 147 to the left and downwardly so that as the table continues to move to the right, the dog 155 is carried to the right therewith but does not engage the lug by reason of its lowered position. Just prior to the right hand end of the movement of the table before it is brought to rest by suitable automatic mechanism, the roller 142 engages the bell crank lever 139 and withdraws the gage out of the bore of the workpiece.

This same operation continues for each successive workpiece until the cutting tool is worn to such an extent that the bore of a finished workpiece does not permit the gage to enter therein. When this occurs, during the right hand movement of the table, the gage abuts the end of the workpiece and is prevented from entering within said workpiece. Thus, the bell crank lever 139 is not rotated counterclockwise to the normal extent and therefore the lug 147 is maintained in its right hand position in the path of the dog so that lever 152 is swung upwardly by said lug to actuate the pawl 123, and the cutting tool is thus moved laterally of the table to compensate for the wear thereon. After this compensatory movement, the normal operation on each workpiece continues on successive workpieces until the wear on the cutting tool is such that the finished bore of a workpiece fails to permit the gage to enter therein.

From the foregoing, it will be apparent that the invention is applied to a machine which is arranged for the successive reduction of a plurality of workpieces to a predetermined dimension, in which machine the cutting operation involves passage of the cutting tool along a surface of the workpiece, the cutting tool during the cutting operation being maintained in predetermined relation to the axis of the workpiece. At the completion of the cutting operation during the withdrawal of the tool from the workpiece, a work-calipering means tests the dimension of the workpiece, that is, when the gage member enters the bore of the workpiece it indicates that the bore of the workpiece is enlarged by the cutting operation to the desired dimension, and upon failure of the gage member to enter the workpiece, it indicates that the finished workpiece is under dimension as a result of the wear on the cutting tool. Thus, the work-calipering or gage means has a normal movement, which involves the entry of said gaging means into the finished bore of the workpiece, said normal movement being interrupted when the finished dimension of the workpiece does not permit entry of the gage therein. Interruption of the normal movement of the gage means, or failure of the gage means to enter the workpiece, operates to procure a compensatory movement of the cutting tool relative to the workholder so that subsequent workpieces will be finished to the desired dimension. The compensatory movement of the cutting tool is procured during and in response to the withdrawal movement of the table which carries the cutting tool out of the workpiece, but such compensatory movement occurs only when the workpiece is not reduced to the proper finished dimension so that said movement occurs independently of the number of cutting operations between successive compensatory movements.

I claim,

1. In a machine for the machining of one surface of each of a succession of workpieces to a predetermined dimension, a cutting tool and a workholder, means for producing relative rotation between said tool and a workpiece in said workholder, means for effecting the traverse of one of said parts by the other to procure a cutting operation on each successive workpiece, said operation involving a single longitudinal movement of the tool along the surface of the workpiece and subsequent withdrawal of the cutting tool from said workpiece, work-calipering means operative upon the withdrawal of the tool from the workpiece, and means under the control of said work-calipering means and operative only when a workpiece is not machined to the desired dimension as indicated by the calipering means for procuring a compensatory movement of the cutting tool relative to the workholder.

2. In a machine for the successive machining of a plurality of workpieces to a predetermined internal diameter, a cutting tool and a workholder, means for producing relative rotation between said tool and a workpiece in said workholder, means for effecting the traverse of one of said parts by the other for procuring a cutting operation on each successive workpiece, said cutting operation involving a single relative longitudinal traversing movement of said tool over the inner surface of the workpiece and relative withdrawal of the cutting tool from the workpiece at the completion of the cutting operation, means responsive to the withdrawal movement for gaging the internal diameter of the workpiece by entry of a gage member within the bore thereof, and means operative only upon failure of said gage means to enter said workpiece for procuring a compensatory movement of the cutting tool relative to the workholder.

3. In a machine for the successive machining of a plurality of workpieces to a predetermined internal diameter, a cutting tool and a workholder, means for producing relative rotation between said tool and a workpiece in said workholder, means for effecting the traverse of one of said parts by the other for procuring a cutting operation on each successive workpiece, said cutting operation involving a single longitudinal traversing movement of said tool over the inner surface of the workpiece and withdrawal of the cutting tool from the workpiece at the completion of the cutting operation, means responsive to the withdrawal movement for gaging the internal diameter of the workpiece by entry of a gage member within the bore thereof, means operative only upon failure of said gage means to enter said workpiece for procuring a compensatory movement of the cutting tool relative to the workholder, and means responsive to further withdrawal movement of the cutting tool from the workpiece for withdrawing the gage member out of the bore of the workpiece.

4. In a machine for the successive machining of a plurality of workpieces to a predetermined internal diameter, a cutting member and a workholding member, means for producing relative rotation between said members, a reciprocatory table on which one of said members is mounted, means to procure a single reciprocatory movement of said table to effect traverse of each workpiece by said cutting member and withdrawal of the latter from said workpiece, a gage member, means responsive to movement of the table during the withdrawal movement of the cutting member from the workpiece for moving said gage member toward the workpiece, said gage member being adapted to enter the bore of said workpiece when the latter is finished to the predetermined internal diameter, and means operative only upon failure of the gage member to enter the bore of the workpiece for procuring a lateral movement of the cutting member relative to the workholding member.

5. In a machine for the successive machining of a plurality of workpieces to a predetermined internal diameter, a cutting member and a workholding member, means for producing relative rotation between said members, a reciprocatory table on which one of said members is mounted, means to procure a single reciprocatory movement of said table to effect traverse of each workpiece by said cutting member and withdrawal of the latter from said workpiece, a gage member, means responsive to movement of the table during the withdrawal movement of the cutting member from the workpiece to move said gage member toward the workpiece, said gage member being adapted to enter the bore of said workpiece when the latter is finished to the predetermined internal diameter, means operative upon failure of the gage member to enter the bore of the workpiece for procuring a lateral movement of the cutting member relative to the workholding member, and means responsive to further withdrawal movement of the table for withdrawing the gage member out of contact with the workpiece.

6. In a machine for the successive machining of a plurality of workpieces to a predetermined internal diameter, a cutting member and a workholding member, means for producing relative rotation between said members, a reciprocatory table on which one of said members is mounted, means to actuate said table to procure a cutting operation of the cutting member on a workpiece in the workholding member, said cutting operation involving movement of the table in one direction to carry the cutting member over the inner surface of the workpiece and subsequent movement of the table in the opposite direction to withdraw the cutting member from engagement with the workpiece, a gage normally out of engagement with the workpiece, means for moving said gage toward the workpiece in response to the withdrawal movement of the cutting member from the workpiece, said gage being prevented from entering the workpiece when said workpiece is not finished to the predetermined internal diameter, and means controlled by the failure of said gage to enter the bore of the workpiece and operative during the withdrawal movement of the cutting member from the workpiece for procuring a transverse feeding movement of the cutting member relative to the workpiece.

7. In a boring machine for the successive machining of a plurality of workpieces to a predetermined internal diameter, a workholding member providing for rotation of a workpiece positioned therein, a boring tool mounted in fixed relation to the axis of the workholder during each successive cutting operation, work-calipering means operative after the completion of each cutting operation, and means under the control of said work-calipering means for procuring a lateral movement of the boring tool relative to the axis of the workholder when a workpiece in said workholder is not finished to the desired internal diameter as indicated by said work-calipering means.

8. In a boring machine for the successive machining of a plurality of workpieces to a predetermined internal diameter, a rotatable workholder, a boring tool mounted in fixed relation to the axis of the workholder during each cutting operation, gage means operable after the completion of the cutting operation on each successive workpiece for entering the bore thereof if the latter is finished to the predetermined internal diameter, means to procure a lateral movement of the boring tool relative to the axis of the workholder when the finished internal diameter of the workpiece prevents entry of the gage means therein, and automatic means operable after the testing of the internal diameter of the workpiece by said gage means for withdrawing the latter from the bore of the workpiece.

9. In a boring machine for the successive machining of a plurality of workpieces to a predetermined internal diameter, a rotatable workholder, a boring tool mounted in fixed relation to the axis of the workholder during each cutting operation, gaging means operable after the completion of each cutting operation, and after the boring tool is withdrawn from the workpiece, for entry within the bore of said workpiece if the latter is finished to the predetermined internal diameter, and means responsive to failure of said gaging means to enter the bore of the workpiece and operable during the withdrawal movement of the boring tool from the workpiece for procuring a lateral movement of the boring tool relative to the axis of the workholder.

10. In a boring machine for the successive machining of a plurality of workpieces to a predetermined internal diameter, a rotatable workholder, a boring tool mounted in fixed relation to the axis of the workholder during each cutting operation, gaging means operable after the completion of each cutting operation, and after the boring tool is withdrawn from the workpiece for entry within the bore of said workpiece if the latter is finished to the predetermined internal diameter, means responsive to failure of said gaging means to enter a finished bore for procuring a lateral movement of the boring tool relative to the axis of the workholder, and means operable after the operation of said gaging means and responsive to the withdrawal movement of the tool from the workpiece for withdrawal of the gaging means from the bore of said workpiece.

11. In a boring machine for the successive machining of a plurality of workpieces to a predetermined internal diameter, a workholding member, a boring tool, means for producing relative rotation between said tool and a workpiece in said workholding member, means for effecting the traverse of one of said parts by the other to procure a cutting operation on each successive workpiece, means for gaging the finished internal diameter of each successive workpiece after the cutting operation thereon is completed, and means under the control of the gaging means to procure a lateral movement of the boring tool relative to the workholding member when the finished workpiece bore does not permit entry therein of said gaging means.

12. In a boring machine for the successive machining of a plurality of workpieces to a predetermined internal diameter, a workholding member, a boring tool, means for producing relative rotation between said tool and a workpiece in said workholding member, means for effecting the traverse of one of said parts by the other to procure a cutting operation on each successive workpiece, means for gaging the finished internal diameter of each successive workpiece after the cutting operation thereon is completed, and means under the control of the gaging means to procure a lateral movement of the boring tool relative to the workholding member when the finished workpiece bore does not permit entry therein of said gaging means, said gaging means being normally out of contact with the workpiece and being operative during the withdrawal of the boring tool from the workpiece at the end of the cutting operation.

13. In a machine for the successive machining of a plurality of workpieces to a predetermined internal diameter, a workholding member, a cutting member, means for producing relative rotation between said cutting member and a workpiece in said workholding member, a table on which one of said members is mounted, means for reciprocating said table to procure a cutting operation on each successive workpiece, said operation involving a predetermined movement of said cutting member over the inner surface of a workpiece in the workholding member and subsequent withdrawal of said cutting member from the workpiece, a gage member, means to maintain said gage member out of contact with the workpiece during the cutting operation, means responsive to the withdrawal of the cutting member from the workpiece for urging said gage member toward the workpiece, said gage member being arranged to enter the bore of said workpiece if the latter by said cutting operation has been finished to the predetermined internal diameter, a normally open electric circuit, an electromagnet in said circuit, means operable upon failure of a finished workpiece bore to admit said gage member for partially closing said circuit, means responsive to the withdrawal movement of said cutting member from the workpiece for completing said circuit to energize said electromagnet, and means operated by the energization of said electromagnet for procuring a compensatory lateral adjustment of the cutting member.

14. In a machine for the successive machining of a plurality of workpieces to a predetermined internal diameter, a workholding member, a cutting member, means for producing relative rotation between said cutting member and a workpiece in said workholding member, a table on which one of said members is mounted, means for reciprocating said table to procure a cutting operation on each successive workpiece, said operation involving a predetermined movement of said cutting member over the inner surface of a workpiece in the workholding member and subsequent withdrawal of said cutting member from the workpiece, a gage member, means to maintain said gage member out of contact with the workpiece during the cutting operation, means responsive to the withdrawal of the cutting member from the workpiece for urging said gage member toward the workpiece, said gage member being arranged to enter the bore of said workpiece if the latter by said cutting operation has been finished to the predetermined internal diameter, a normally open electric circuit, an electromagnet in said circuit, means operable upon failure of a finished workpiece bore to admit said gage member for partially closing said circuit, means responsive to the withdrawal movement of said cutting member from the workpiece for completing said circuit to energize said electromagnet, and means responsive to further withdrawal movement of the cutting member from the workpiece to withdraw the gage member from contact with the workpiece.

15. In a boring machine for the successive machining of a plurality of workpieces to a predetermined internal diameter, a workholder and a boring tool, means for producing relative rotation between said parts and for effecting the traverse of one by the other, to procure a cutting operation on each successive workpiece, work-calipering means operative at the end of each cutting operation in response to separation of the boring tool from the workpiece after the completion of the cutting operation, and means under the control of the work-calipering means and operable in response to the separation of the boring tool from the workpiece for procuring a lateral movement of the boring tool when the finished workpiece in said workholder has an internal diameter that prevents entry of said work-calipering means.

16. In a boring machine for the successive machining of a plurality of workpieces to a predetermined internal diameter, a workholder and a boring tool, means for producing relative rotation between said parts and for effecting the traverse of one by the other, to procure a cutting operation on each successive workpiece, work-calipering means operative at the end of each cutting operation in response to separation of the boring tool from the workpiece after the completion of the cutting operation, means under the control of the work-calipering means and operable in response to the separation of the boring tool from the workpiece for procuring a lateral movement of the boring tool when the finished workpiece in said workholder has an internal diameter that prevents entry of said work-calipering means, and means responsive to further separation of the boring tool from the workpiece for moving said work-calipering means to an inoperative position.

17. In a boring machine for the successive machining of a plurality of workpieces to a predetermined internal diameter, a rotatable workholder, a boring tool mounted in fixed relation to the axis of said workholder during the cutting operation on each successive workpiece, said cutting operation involving a relative movement of said tool over the inner surface of the workpiece and subsequent withdrawal of the boring tool from engagement with the workpiece, work-calipering means operable upon the withdrawal of said tool from the workpiece for testing the internal diameter thereof, and means under the control of said work-calipering means for procuring a movement of the boring tool relative to the axis of the workholder when the finished workpiece is not reduced to the desired internal diameter as indicated by said work-calipering means, said last-mentioned means being inoperative when the workpiece is reduced to the proper internal diameter.

18. In a boring machine for the successive machining of a plurality of workpieces to a predetermined internal diameter, a rotatable workholder, a boring tool mounted in fixed relation to the axis of said workholder during the cutting operation on each successive workpiece, said cutting operation involving a relative movement of said tool over the inner surface of the workpiece and subsequent withdrawal of the boring tool from engagement with the workpiece, work-calipering means operable upon the withdrawal of said tool from the workpiece for testing the internal diameter thereof, and means under the control of said work-calipering means and responsive to the withdrawal movement of the tool from the workpiece for procuring a movement of the boring tool relative to the axis of the workholder when the finished workpiece is not reduced to the desired internal diameter as indicated by said work-calipering means, said last-mentioned means being inoperative when the workpiece is reduced to the proper internal diameter.

19. In a boring machine for the successive machining of a plurality of workpieces to a predetermined internal diameter, a rotatable workholder, a boring tool mounted in fixed relation to the axis of said workholder during the cutting operation on each successive workpiece, said cutting operation involving a relative movement of said tool over the inner surface of the workpiece and subsequent withdrawal of the boring tool from engagement with the workpiece, work-calipering means operable upon the withdrawal of said tool from the workpiece for testing the internal diameter thereof, means under the control of said work-calipering means and responsive to the withdrawal movement of the tool from the workpiece for procuring a movement of the boring tool relative to the axis of the workholder when the finished workpiece is not reduced to the desired internal diameter as indicated by said work-calipering means, said last-mentioned means being inoperative when the workpiece is reduced to the proper internal diameter, and other means responsive to the withdrawal movement and operable after the work-calipering means have tested the internal diameter of the workpiece for procuring a movement of said work-calipering means to inoperative position.

20. In a machine for the machining of one surface of each of a succession of work pieces to a predetermined dimension, a work-holding member and a cutting member, means for producing relative rotation between said parts and for effecting the traverse of one by the other, to procure a cutting operation on each successive workpiece, said operation involving a predetermined relative movement of said cutting member over the surface of a workpiece in the workholding member and subsequent relative withdrawal of said cutting member from the workpiece, work-calipering means operative in response to the withdrawal of the cutting member from the workpiece, a normally open electric circuit, an electromagnet therein adapted when energized to procure a lateral movement of the cutting member, means under the control of the work-calipering means and operable only when the workpiece is not reduced to the desired dimension for partially closing said circuit, and means responsive to the withdrawal movement of said cutting member for completing said circuit, thereby procuring the lateral movement of the cutting member.

21. In a machine for the machining of one surface of each of a succession of workpieces all to the same predetermined dimension, a workholder and a cutting tool, means for producing relative rotation between said parts and for effecting the traverse of one by the other to procure a cutting operation on each successive workpiece, said operation involving a predetermined relative movement between the tool and workholder and subsequent withdrawal of the tool relative to the workholder, work-calipering means for testing the dimension of the workpiece and operative in response to said withdrawal movement after the completion of the cutting operation, and means under the control of the work-calipering means and operative only when the workpiece is not reduced to the proper dimension for procuring a lateral adjustment of the cutting tool, said work-calipering means, when the workpiece is reduced to the desired dimension, having no effect on the position of the cutting tool relative to the workholder.

22. In a machine for the machining of one surface of each of a plurality of workpieces successively all to a predetermined dimension, a cutting tool and a workholder, means for procuring a cutting operation on each successive workpiece, said operation involving a predetermined movement of the tool over the surface of the workpiece and subsequent withdrawal of the cutting tool from said workpiece, said tool and workholder having no relative lateral movement during the cutting operation, work-calipering means operative upon the withdrawal of the tool from a workpiece, and means under the control of said work-calipering means and operative only when the workpiece is not reduced to the desired dimension, as indicated by the calipering means for procuring a relative lateral movement between the cutting tool and the workholder to compensate for wear on the tool.

23. In a machine for the machining of one surface of each of a plurality of workpieces successively all to a predetermined internal diameter, a cutting tool and a workholder, means for procuring a cutting operation on each successive workpiece positioned in said workholder, said cutting operation involving a predetermined movement of the tool over the inner surface of the workpiece in the workholder and subsequent relative withdrawal movement of the cutting tool from the workpiece at the completion of the cutting operation, a gage, means responsive to the withdrawal movement for determining the internal diameter of the workpiece by entry of said gage within the bore thereof, and means operative only upon failure of said gage to enter said workpiece for procuring a lateral movement of the cutting tool relative to the workholder to compensate for wear on the tool.

24. In a machine of the class described, a workholder, a tool holder, means operable to adjust the position of said tool holder relatively to said workholder, a gage brought into action by the completion of the tool's operation on each workpiece in said holder to test the dimension of the finished surface of said workpiece, and means responsive to obstruction of said gage's passage along said surface for so operating the adjusting means for said tool holder as to dispose the tool in a position adapted to produce on the next operation of said tool a surface that will permit passage of said gage.

25. In a machine for cutting successive workpieces to substantially the same size, a workholder and an adjustably mounted tool holder, means operable to adjust said tool holder, a gage for testing the finished dimension of each workpiece, said gage being brought into action by the completion of the tool's operation on each workpiece, means responsive to free passage of said gage along the finished surface for maintaining inoperative the adjusting means for said tool holder, and means responsive to non-passage of said gage along said finished surface for operating said adjusting means to position said tool holder so that the next workpiece will be finished to a dimension permitting the free passage of said gage along the finished surface.

26. In a machine for cutting successive workpieces to substantially the same dimension, a workholder, a tool whose position relative to said workholder determines said dimension, a holder for said tool having an adjustable mounting, a gage brought into operation on each workpiece by the completion of the tool's operation thereon to test the dimension of the tooled surface, and connections between said gage and said adjustable mounting that leave the latter undisturbed if the desired finished dimension has been attained, and that operate said adjustable mounting to reposition said tool if said desired finished dimension has not been attained.

27. In a machine of the class described, a workholder and a boring tool, an eccentric mounting for said tool, permitting adjustment of the tool's position relative to said workholder, a gage held in an inoperative position during the boring operation on each workpiece and made operative to test the dimension of the finished workpiece bore in response to the withdrawal of the tool from said bore, said gage's entry into said finished bore being without influence on said eccentric mounting, means responsive to non-entry of said gage into a finished bore for shifting said eccentric mounting, thereby to reposition the tool so that the next-finished workpiece bore will permit said gage's entry.

28. In a boring machine, the combination with a workholder, of a boring tool adapted normally to produce bores of predetermined size in each of a succession of workpieces, a gaging device brought into action on each finished bore only by the completion of the operation thereon of said tool, means maintaining said machine uninfluenced by said gaging device if the latter enters a finished bore, and means, responsive to such gaging device's non-entry into a finished bore for producing a lateral compensatory adjustment of the relative positions of tool and workholder, whereby to obtain the predetermined size of bore on the next operation of said tool.

29. In a machine of the class described, a cutting tool and a workholder, one of said parts being rotatable, to obtain the cutting action of said tool on a workpiece in said holder, means for effecting the traverse of each workpiece in said holder by said tool, to finish a surface of said workpiece to a dimension determined by the distance of the tool's cutting surface from the axis of such rotation, a gage brought into action by the completion of the cutting operation on each workpiece, to test the dimension of said finished surface, and means actuated by said gage, if said dimension is outside a predetermined limit, to correct the distance of said cutting tool's surface from said axis of rotation.

HAROLD L. BLOOD.